Nov. 7, 1967  R. B. COTTON  3,351,325
AERIAL PICK-UP AND DELIVERY SYSTEM
Filed May 5, 1965  4 Sheets-Sheet 1

INVENTOR
Robert B. Cotton
BY *Birch & Birch*
ATTORNEYS

Nov. 7, 1967 R. B. COTTON 3,351,325
AERIAL PICK-UP AND DELIVERY SYSTEM
Filed May 5, 1965 4 Sheets-Sheet 2

INVENTOR
Robert B. Cotton
BY *Birch & Birch*
ATTORNEYS

Nov. 7, 1967  R. B. COTTON  3,351,325
AERIAL PICK-UP AND DELIVERY SYSTEM
Filed May 5, 1965  4 Sheets-Sheet 3

INVENTOR
Robert B. Cotton
BY *Birch & Birch*
ATTORNEYS

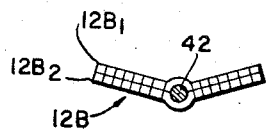
FIG. 12.
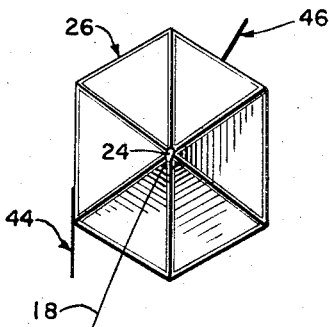
FIG. 13.
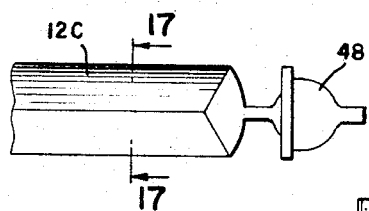
FIG. 16.
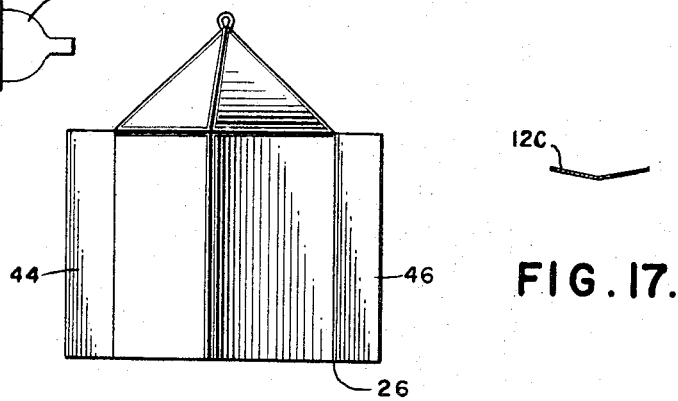
FIG. 17.
FIG. 14.
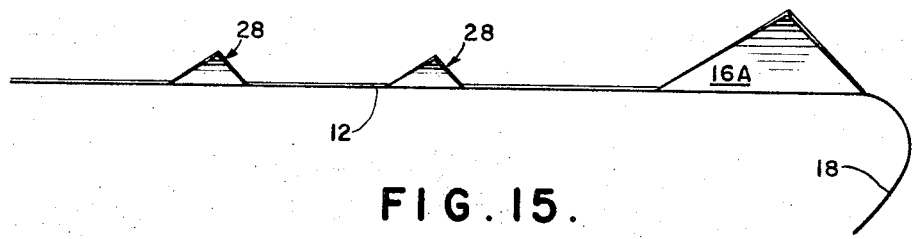
FIG. 15.

United States Patent Office 3,351,325
Patented Nov. 7, 1967

3,351,325
AERIAL PICK-UP AND DELIVERY SYSTEM
Robert B. Cotton, 1503 Old Orchard Road,
Media, Pa. 19065
Filed May 5, 1965, Ser. No. 453,436
28 Claims. (Cl. 258—1.4)

This invention relates to aerial pick-up and delivery systems and more particularly to completely airborne systems of this type having no requisite ground equipment for delivering and picking up cargo or the like to and from, respectively, a ground station of finite area with accuracy, precision and reliability.

It is an object of this invention to provide a new and novel aerial cargo pick-up and delivery system and apparatus wherein both pick-up and delivery of cargo between an aircraft and a ground target area are accomplished by the same system and apparatus.

Another object of this invention is to provide a new and novel aerial cargo pick-up and delivery system and apparatus wherein both pick-up and delivery of cargo between an aircraft and a ground target area are accomplished by the same system and apparatus and wherein said system and apparatus are completely contained in said aircraft, all necessities for ground equipment being obviated.

Still another object of this invention is to provide a new and novel aerial cargo pick-up and delivery system and apparatus wherein both pick-up and delivery of cargo between an aircraft and a ground target area are accomplished by the same system and apparatus, wherein the position of the cargo between the aircraft and the ground target area is a direct function of aircraft altitude and/or airspeed.

Still another object of this invention is to provide a new and novel aerial cargo pick-up and delivery system and apparatus wherein both pick-up and delivery of cargo between an aircraft and a ground target area are accomplished by the same system and apparatus, wherein said pick-up and delivery are effected by circling said ground target area with said aircraft.

Still another object of this invention is to provide a new and novel aerial cargo pick-up and delivery system and apparatus wherein both pick-up and delivery of cargo between an aircraft and a ground target area are accomplished by the same system and apparatus, wherein said pick-up and delivery are effected by circling said ground target area with said aircraft, and further wherein said system and apparatus is fail-safe.

Yet another object of this invention is to provide a new and novel aerial cargo pick-up and delivery system and apparatus wherein both pick-up and delivery of cargo between an aircraft and a ground target area are accomplished by the same system and apparatus, wherein the said system and apparatus include lift means effecting controlled movement of said cargo between said aircraft and said ground target area.

Yet another object of this invention is to provide a new and novel aerial cargo pick-up and delivery system and apparatus wherein both pick-up and delivery of cargo between an aircraft and a ground target area are accomplished by the same system and apparatus, wherein the said system and apparatus include drag means effecting a predetermined airborne configuration of said apparatus with respect to said aircraft and said ground target area while said aircraft is constrained to circle said target area.

These and other objects of this invention will become more fully apparent with reference to the following specification and drawings which relate to several preferred embodiments of the present invention.

In the drawings:

FIGURE 12 is an end view of the lift device of FIGURE 11;

FIGURE 13 is a top plan view of another embodiment of cargo capsule of the present invention;

FIGURE 14 is a side elevation of the cargo capsule of FIGURE 13;

FIGURE 15 is a partial side elevation of another embodiment of the invention;

FIGURE 16 is a top plan view of another embodiment of the invention; and

FIGURE 17 is a section taken along line 17—17 of FIGURE 16.

Figure 1:
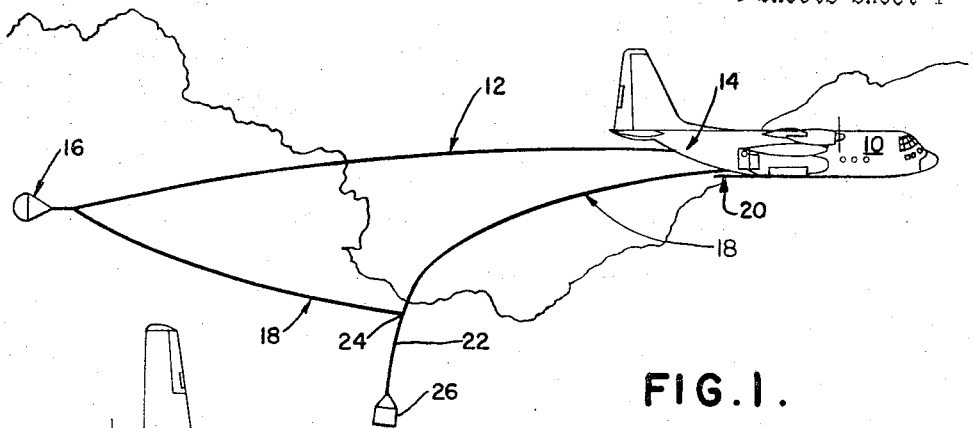
FIGURE 1 is a side elevation of the system and apparatus of the present invention in a quiescent state of operation trailing behind a flying aircraft.

Basically, the system of the present invention comprises a relatively high lift, elongated main tow means extending from the rear of an aircraft to a drag means; a relatively low lift, elongated cargo tow means extending from the rear of the aircraft to the drag means and a cargo capsule, airborne pallet means or the like suspended from a point on the cargo tow means intermediate the aircraft and the drag means. The aircraft is flown in a substantially constant radius circle and the trailing drag means will dispose itself 180° out of phase with the aircraft, thereby deploying the main and the cargo tow means in a semicircle or "half-moon" shape in the atmosphere between the aircraft and the drag means. The difference in lift between the main and cargo tow means and the presence of the cargo capsule on the latter cause the cargo capsule to be maintained at the center of the orbit or circle described by the aircraft and thereby provide substantially pin-point retrieval or delivery accuracy of a cargo payload from a predetermined finite ground target area as will be hereinafter more fully described.

Referring in detail to the drawings, and more particularly to FIGURES 1, 2, 3, 4 and 5 one embodiment of a pick-up and delivery system of the present invention will now be described.

An aircraft 10, shown in flight, is the source of power or driving energy for the system which includes a high lift main tow means 12 extending from an anchored position 14 on the rear of the aircraft 10 to a drag means 16, the latter comprising a parachute and being connected to the said aircraft 10 via the main tow means 12.

A cargo tow means 18 of relatively low lift characteristics in comparison with the main tow means is connected from a second anchored position 20 on the aircraft 10 to the drag means 16. A cargo leader 22 is connected to an intermediate point 24 on the cargo tow means 18 and a cargo capsule or pallet 26 is suspended from the other end of the cargo leader 22.

Referring to FIGURES 2, 7, 8 and 9, the details of one embodiment of the invention including a plurality of lift devices 28 mounted at spaced intervals on the main tow means 12, which in this instance comprises a nylon rope or tape, will be described.

Each of the lift devices 28 comprises a thin sheet of metal or the like cut into a square and bent along a diagonal 30, along which the nylon rope or cable comprising the main tow means 12 is disposed. Each device 28 is securely fixed to the main tow means 12 by any suitable means. The dihedral angle DA provided to the lift devices 28 by the binding along the diagonals 30 thereof can be, for example, 30°. Thus, a plurality of kite-shaped wings or the like, comprising the lift devices 28, are provided at spaced intervals throughout the length of the main tow means 12.

Figure 6:
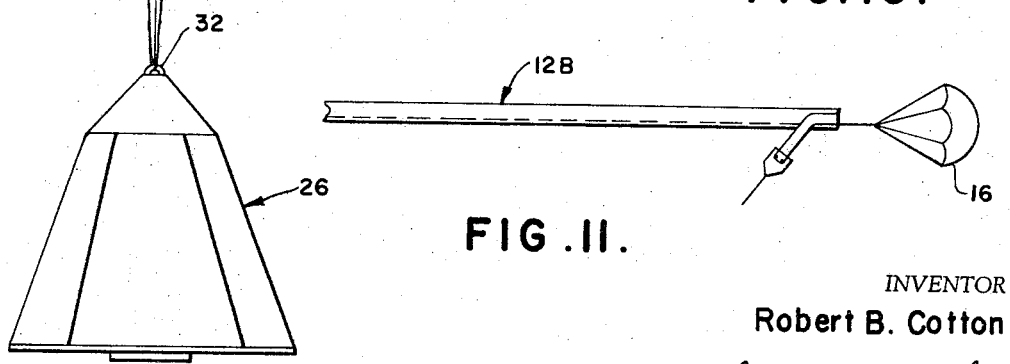
FIGURE 6 is a side elevation of a fail-safe means and cargo capsule embodiment of the present invention.

Referring now to FIGURE 6, a cargo capsule 26 is shown as including a top cable connection 32 or the like to which is affixed one end of the leader 22 and the shroud lines 34 of a fail-safe parachute assembly 36. The leader 22 extends through the canopy of the parachute 36 and the apex 38 of said canopy is maintained in a maximum vertical displacement with respect to the leader 22 by a spring pigtail connector 40 between the said apex 38 and leader 22, the force of the said connector 40 on the said apex 38 adapted to be overridden by the drag load of the parachute 36 during descents of the cargo capsule 26 at rates above a predetermined minimum.

Figure 10:
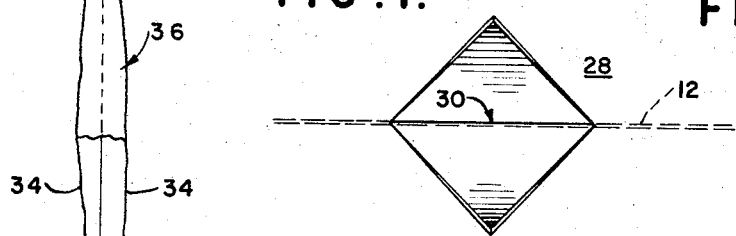
FIGURE 10 is a perspective of another embodiment of lift device utilized in the present invention.

Referring now to FIGURE 10, another embodiment of the main tow means is shown as comprising a double tape configuration 12A having a cruciform cross-section.

Figure 11:
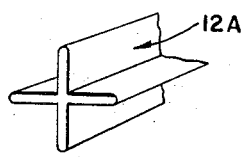
FIGURE 11 is a side elevation of yet another lift device of the present invention.

A third embodiment of the main tow means is shown in FIGURES 11 and 12 as comprising a double tape configuration 12B comprising first and second coextensive laminated nylon tapes 12B1 and 12B2, bent along the longitudinal axes thereof and bonded together to house a steel tow cable 42 or the like therebetween along said axes, the said tapes 12B1 and 12B2 being sufficiently resilient to form a V-shaped cross-section in flight, thereby providing a continuous wing-like structure for the main tow means.

Because of the presence of some lift and centrifugal forces on the cargo tow means 18, it may be necessary to provide stabilizing means for the cargo capsule 26 whenever cargo weights or the like are too low to overcome these forces. Accordingly, referring to FIGURES 13 and 14, a cargo capsule 26 is shown as including first and second stabilizing vanes 44 and 46, respectively, disposed in vertical planes and extending from the sides of the capsule 26. The first vane 44, in top plan, inwardly, converges toward the path of flight assumed by the cargo tow means 18 and assumes a position forward of the capsule 26 with respect to the direction of flight of the capsule. The second vane 46 is a trailing airfoil and extends behind the capsule 26 with respect to the direction of flight. Of course, as will be hereinafter more fully described, once the aircraft 10 enters a constant radius circle the capsule 26 tends to assume a relatively fixed position in space in a horizontal coordinate direction and move only in a vertical coordinate direction.

If very high lift requirements are found, the embodiment of FIGURE 15 can be utilized. This embodiment substitutes a high lift drag means 16a which, for example, may be merely an airfoil comprised of an enlarged version of the lift devices 28 in place of the parachute type drag means 16.

High strength, high lift tow means which occupy an optimally minimum amount of storage space within the aircraft, are illustrated in FIGURES 16 and 17. The main tow means 12C comprises a thin stainless steel tape having a central crease which provides a selected amount of dihedral angle (FIGURE 17). A coupling means 48 is provided at the outer end of the tape 12C whereby a drag means (not shown) such as the parachute 16 or airfoil 16A may be affixed thereto.

OPERATION

Referring to FIGURES 1, 2, 3, 4 and 5, a sequence of operation of the system and apparatus of the present invention will now be described.

Figure 2:
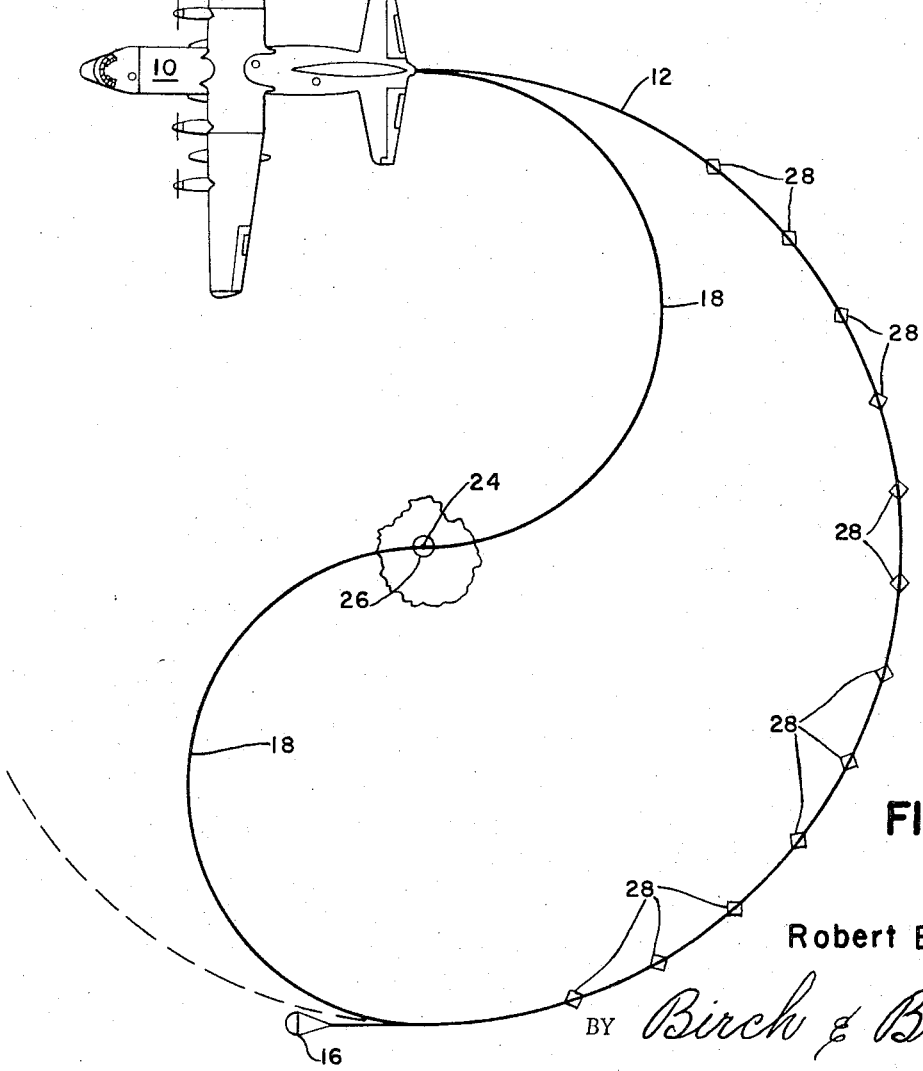
FIGURE 2 is a top plan view of the system and apparatus of the present invention during an operative cargo transfer cycle between an aircraft and a ground target area.
Figure 3:
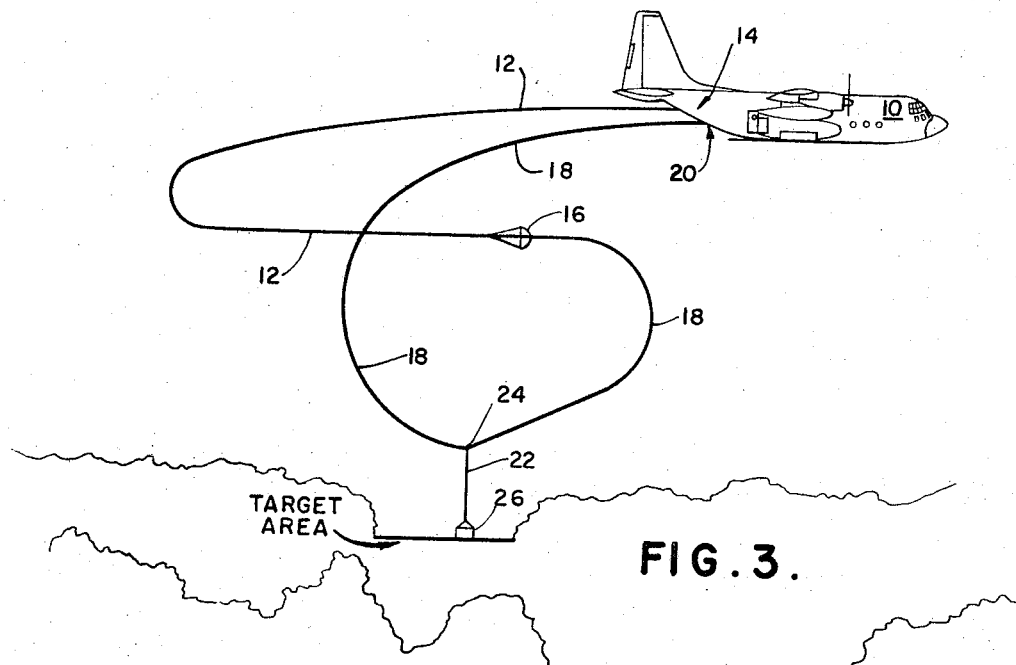
FIGURE 3 is a side elevation of FIGURE 2.

Assuming that the apparatus of the present invention has been deployed behind the aircraft 10 in the configuration shown in FIGURE 1 by the use of inboard winches or the like in the aircraft 10, an example of the relative dimensions of the various component parts of the system is as follows:

Length of main and cargo tow means 12 and 18 _____ ft__ 4800
Drag load of drag means 16 (parachute) at 150 knots air speed _____ lbs__ 2000
Length of cargo leader 24 _____ ft__ 100
Weight of cargo capsule 26 _____ lbs__ 500
Diameter of flight circle of FIGURE 2 _____ ft__ 3000

When the aircraft 10 reaches the target area, as shown and captioned in FIGURE 2, the main and cargo tow means 12 and 18, respectively, drag means 16 and cargo capsule 26 are deployed as shown in FIGURE 1 and the aircraft 10 is flown in a circle with the target area at the approximate center thereof.

Once the aircraft 10 is flying in this circle, the drag means 16 will be deployed at an altitude with respect to the said aircraft determined by the lift of the drag means 16 and main tow means 12 and will be located 180° out of phase with the said aircraft on the periphery of the circle. This result is effected by the drag of the drag means 16, either of the parachute or wing type, and the combined lift of the drag means 16 and main tow means 12.

Since the cargo tow means 18 has relatively low lift, the configuration of the system constrains the cargo capsule 26 to seek the center of the flight circle (i.e. directly over the target area) at an altitude below that of the aircraft 10 and main tow means 12.

Once a stable central position of the cargo capsule 26 has been established, the aircraft 10 is caused to decrease its altitude and/or reduce its speed while maintaining the flight circle and the capsule 26 is thereby lowered to contact the target area where cargo may be either transferred from the cargo capsule 26 to the ground target area or vice versa to effect a delivery or pick-up, respectively.

Once the capsule 26 has engaged the target area (FIGURE 3), the aircraft 10 is maintained at a constant altitude in the flight circle until lift-off of the said capsule is desired, at which time the aircraft is caused to increase its altitude and/or increase its speed and impart a vertical lift to the capsule 26 because of the main tow means 12 and the drag means 16 being constrained to follow the said aircraft 10 by the lift charatceristics thereof.

Figure 4:
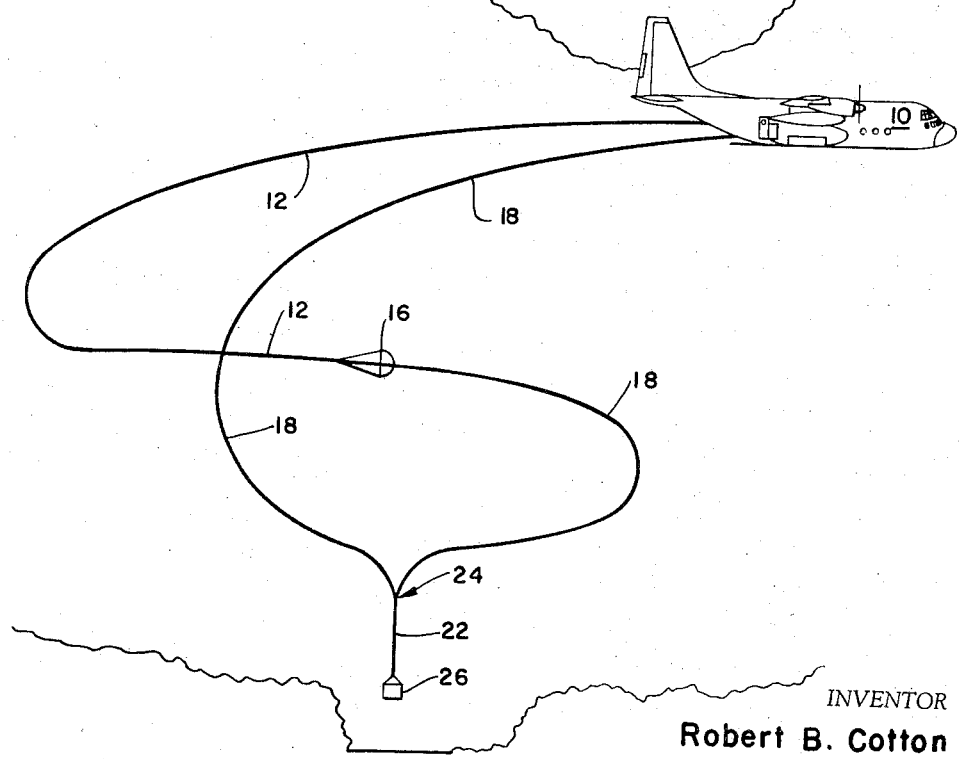
FIGURE 4 is a side elevation of FIGURE 2 at a different point of time in a cargo transfer cycle from that shown in FIGURE 3.
Figure 5:
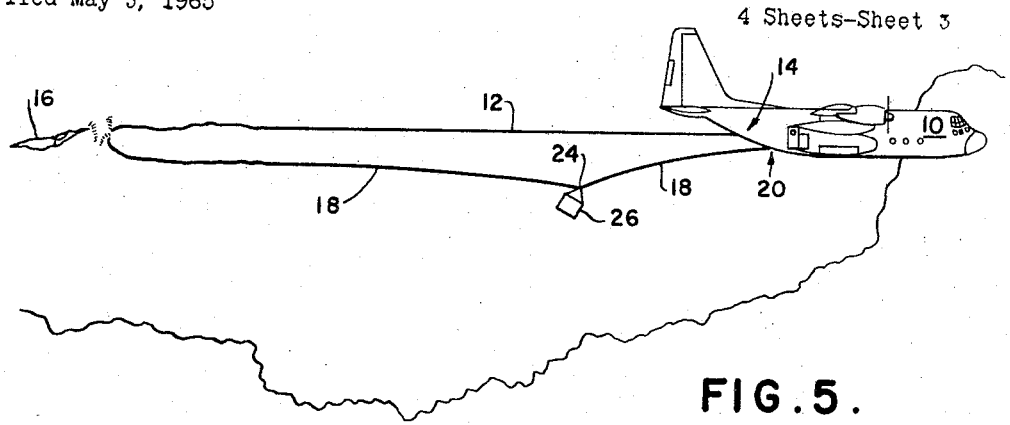
FIGURE 5 is a side elevation of the present invention in the terminal phase of a cargo pick-up cycle.
Figures 7, 8:
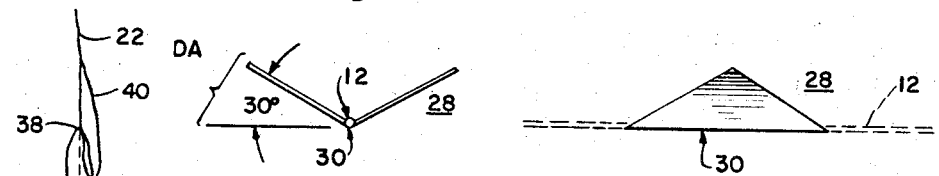
FIGURE 7 is an end view of a lift device utilized in the present invention.
FIGURE 8 is a side elevation of the lift device of FIGURE 7.
Figure 9:
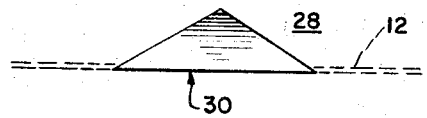
FIGURE 9 is a top plan view of the lift device of FIGURE 7.

Thus, as shown in FIGURE 4, the capsule 26 will lift-off from the target area and after reaching a sufficient altitude, the aircraft 10 will be flown out of the flight circle and draw the system into the tow configuration shown in FIGURE 5. If desired, there may be a squib driven cutter or the like in the system to sever the drag means 16 therefrom as generally shown in FIGURE 5, the tow means 12 and 18 and the capsule 26 being readily drawn into the aircraft 10 by suitable winches or the like (not shown).

Should the rate of descent of the capsule 26 be too great or should a failure occur, the embodiment of FIGURE 6 provides a fail-safe control for same. Should the rate of descent create a drag in the series parachute 36 which exceeds the spring load of the pigtail 40, the apex 38 will drop, the parachute canopy will open and the capsule 26 will be constrained to fall at a predetermined maximum safe rate.

The operation of the embodiments of FIGURES 7, 8, 9, 11, 12 and 15 is identical with those of FIGURES 1, 2, 3, 4 and 5, the various lift devices of the former being incorporated as an integral part of the main tow means 12 of the latter to enhance the lift characteristics thereof.

Also, in the embodiment of FIGURE 15, there is sufficient drag in the drag means 16A to effect the 180° out-of-phase relationship between the said drag means 16A and the aircraft, although much higher lift and consequently heavier payloads will result.

As for the embodiment of FIGURES 13 and 14, since during the operation of the system of the present invention there is a centrifugal force initially generated on the cargo capsule 26 when the aircraft 10 goes into a flight circle (predetermined horizontal orbit) to effect a pick-up and/or delivery at the target area, this force is compensated by the inward force generated by the inwardly pointing first stabilizing vane 44 on the said capsule 26. Therefore, the capsule 26 is constrained to achieve the center of the flight circle by the force of gravity.

As can be seen from the foregoing specification and drawings, this invention provides a new and novel pick-up and delivery system and apparatus which satisfy many long felt needs in the art.

For example, one of the primary problems in air-to-ground pick-up and delivery systems is the need to operate at altitudes below five hundred feet, which is below the radar screen in enemy territory during wartime operation of such a system. The present invention can be utilized at such altitudes since the lift of the main tow means 12 can be controlled, for example, by setting the angle of attack of the lift devices 28 thereon in the embodiment of FIGURE 2. Thus, it is possible to cause the main tow means 12 and drag means 16 to assume an equal or greater altitude than that of the aircraft 10 and the said aircraft can then fly at low altitudes without fear of fouling the cargo transfer systems on ground objects.

There is no need in the system of the present invention for the aircraft to contact any airbone or ground tethered device to effect accurate cargo transfer between the said aircraft and a ground target area. Neither is there any need for there to be any equipment whatsoever at the ground target area, the system is entirely self-contained within the aircraft.

The system is inherently capable of higher safety factors of operation than other systems since the weight and strength of the various tow means and component parts of the system can be readily varied without rendering the said system ineffective.

Further, and of primary importance, the system is so stable and controllable that very low-G accelerations may be effected on the cargo during a pick-up operation.

It is to be understood that the several embodiments shown and described herein are for the purpose of example and are not intended to limit the scope of the appended claims.

What is claimed is:

1. Means for transferring a cargo between an aircraft in flight and a ground target area comprising first tow means adapted to be connected at one end to and extended from an air aircraft, drag means connected at the other end of said first tow means, second tow means adapted to be extended from said aircraft to said drag means, and cargo carrying means connected to said second tow means intermediate the ends thereof, said first tow means having greater aerodynamic lift than said second tow means and being adapted to maintain said cargo airborne behind said aircraft, and said drag means being adapted to effect a predetermined orientation of said cargo carrying means and said tow means with respect to said aircraft; wherein said first tow means comprises elongated cable means and a plurality of regularly spaced lift devices affixed thereto; and further, wherein said drag means comprises a parachute.

2. Means for transferring a cargo between an aircraft in flight and a ground target area comprising first tow means adapted to be connected at one end to and extended from an aircraft, drag means connected at the other end of said first tow means, second tow means adapted to be extended from said aircraft to said drag means, and cargo carrying means connected to said second tow means intermediate the ends thereof, said first tow means having greater aerodynamic lift than said second tow means and being adapted to maintain said cargo airborne behind said aircraft, and said drag means being adapted to effect a predetermined orientation of said cargo carrying means and said tow means with respect to said aircraft; wherein said first tow means comprises elongated cable means and a plurality of regularly spaced lift devices affixed thereto; and further, wherein said drag means comprises an airfoil.

3. Means for transferring a cargo between an aircraft in flight and a ground target area comprising first tow means adapted to be connected at one end to and extended from an aircraft, drag means connected at the other end of said first tow means, second tow means adapted to be extended from said aircraft to said drag means, and cargo carrying means connected to said second tow means intermediate the ends thereof, said first tow means having greater aerodynamic lift than said second tow means and being adapted to maintain said cargo airborne behind said aircraft, and said drag means being adapted to effect a predetermined orientation of said cargo carrying means and said tow means with respect to said aircraft; wherein said cargo carrying means includes a support means, a leader interconnecting said support means with said second tow means, parachute means including shroud lines and a canopy, said shroud lines being connected with said support means and said leader passing through the apex of said canopy, and resilient means interconnecting said canopy and said leader maintaining the apex of said canopy away from said support means, thereby holding said canopy in a reefed condition.

4. Means for transferring a cargo between an aircraft in flight and a ground target area comprising first tow means adapted to be connected at one to and extended from an aircraft, drag means connected at the other end of said first tow means, second tow means adapted to be extended from said aircraft to said drag means, and cargo carrying means connected to said second tow means intermediate the ends thereof, said first tow means having greater aerodynamic lift than said second tow means and being adapted to maintain said cargo airborne behind said aircraft, and said drag means being adapted to effect a predetermined orientation of said cargo carrying means and said tow means with respect to said aircraft; wherein said first tow means comprises an elongated tape having a cruciform cross-section.

5. The invention defined in claim 4, wherein said drag means comprises a parachute.

6. The invention defined in claim 4, wherein said drag means comprises an airfoil.

7. Means for transferring a cargo between an aircraft in flight and a ground target area comprising first tow means adapted to be connected at one end to and extended from an aircraft, drag means connected at the other end of said first tow means, second tow means adapted to be extended from said aircraft to said drag means, and cargo carrying means connected to said second tow means intermediate the ends thereof, said first tow means having greater aerodynamic lift than said second tow means and being adapted to maintain said cargo airborne behind said aircraft, and said drag means being adapted to effect a predetermined orientation of said cargo carrying means and said tow means with respect to said aircraft; wherein said first tow means comprises a cable for interconnecting said aircraft and said drag means and tape means substantially coterminate with said cable, said tape means being fixed along the longitudinal axis thereof to said cable and providing increased aerodynamic lift in said first tow means.

8. The invention defined in claim 7, wherein said tape is deformed into an elongated channel of V-shaped cross-section with said cable positioned at the apex thereof.

9. The invention defined in claim 7, wherein said drag means comprises a parachute.

10. The invention defined in claim 9, wherein said tape is deformed into an elongated channel of V-shaped cross-section with said cable positioned at the apex thereof.

11. The invention defined in claim 7, wherein said drag means comprises an airfoil.

12. The invention defined in claim 11, wherein said tape is deformed into an elongated channel of V-shaped cross-section with said cable positioned at the apex thereof.

13. A system for transferring cargo between an aircraft flying in a flight circle of predetermined diameter and a ground target area below said aircraft substantially vertically below the center of said circle comprising an aircraft, first tow means connected at one end to said aircraft and extending substantially around the periphery of said flight circle with the other end thereof at a point substantially diametrically opposed to said aircraft, drag means connected on said other end of said first tow means maintaining said tow means substantially contiguous with said periphery, second tow means extending from said aircraft to said drag means and having an intermediate portion thereof vertically below the center of said circle, and cargo carrying means connected to said second tow means at said intermediate portion thereof, said first tow means having greater aerodynamic lift than said second tow means and the relative vertical position and movement of said cargo carrying means with respect to the center of said circle being controllable as functions of the altitude and velocity, respectively, of said aircraft.

14. The invention defined in claim 13, wherein said drag means comprises a parachute.

15. The invention defined in claim 13, wherein said drag means comprises an airfoil.

16. The invention defined in claim 13, wherein said first tow means comprises elongated cable means and a plurality of regularly spaced lift devices affixed thereto.

17. The invention defined in claim 13, wherein said first tow means comprises elongated cable means and a plurality of regularly spaced lift devices affixed thereto; and further, wherein said drag means comprises a parachute.

18. The invention defined in claim 13, wherein said first tow means comprises elongated cable means and a plurality of regularly spaced lift devices affixed thereto; and further wherein said drag means comprises an airfoil.

19. The invention defined in claim 13, wherein said cargo carrying means includes a support means, a leader interconnecting said support means with said second tow means, parachute means including shroud lines and a canopy, said shroud lines being connected with said support means and said leader passing through the apex of said canopy, and resilient means interconnecting said canopy and said leader maintaining the apex of said canopy away from said support means, thereby holding said canopy in a reefed condition.

20. The invention defined in claim 13, wherein said first tow means comprises an elongated tape having a cruciform cross-section.

21. The invention defined in claim 13, wherein said first tow means comprises an elongated tape having a cruciform cross-section; and further, wherein said drag means comprises a parachute.

22. The invention defined in claim 13, wherein said first tow means comprises an elongated tape having a cruciform cross-section; and further, wherein said drag means comprises an airfoil.

23. The invention defined in claim 13, wherein said first tow means comprises a cable interconnecting said aircraft and said drag means and tape means substantially coterminate with said cable, said tape means being fixed along the longitudinal axis thereof to said cable.

24. The invention defined in claim 23, wherein said tape is deformed into an elongated channel of V-shaped cross-section with said cable positioned at the apex thereof.

25. The invention defined in claim 13, wherein said first tow means comprises a cable interconnecting said aircraft and said drag means and tape means substantially coterminate with said cable, said tape means being fixed along the longitudinal axis thereof to said cable; and further, wherein said drag means comprises a parachute.

26. The invention defined in claim 25, wherein said tape is deformed into an elongated channel of V-shaped cross-section with said cable positioned at the apex thereof.

27. The invention defined in claim 13, wherein said first tow means comprises a cable interconnecting said aircraft and said drag means and tape means substantially coterminate with said cable, said tape means being fixed along the longitudinal axis thereof to said cable; and further, wherein said drag means comprises an airfoil.

28. The invention defined in claim 27, wherein said tape is deformed into an elongated channel of V-shaped cross-section with said cable positioned at the apex thereof.

References Cited

UNITED STATES PATENTS

| | | | |
|---|---|---|---|
| 1,805,002 | 5/1931 | Neumeyer | 40—215 |
| 1,829,474 | 10/1931 | Chilowsky | 244—137 |
| 2,011,202 | 8/1935 | Satterlee | 40—215 |
| 2,122,766 | 7/1938 | Wiemer | 244—3 X |
| 2,151,395 | 3/1939 | Smith | 244—138 |
| 3,112,900 | 12/1963 | Yost | 244—3 |

FOREIGN PATENTS 659,654    2/1929    France.

ROBERT B. REEVES, *Primary Examiner.*

KENNETH N. LEIMER, *Examiner.*